(No Model.) 2 Sheets—Sheet 1.

R. METZ.
WASTE OIL PURIFIER.

No. 572,020. Patented Nov. 24, 1896.

WITNESSES:

INVENTOR

BY

ATTORNEYS.

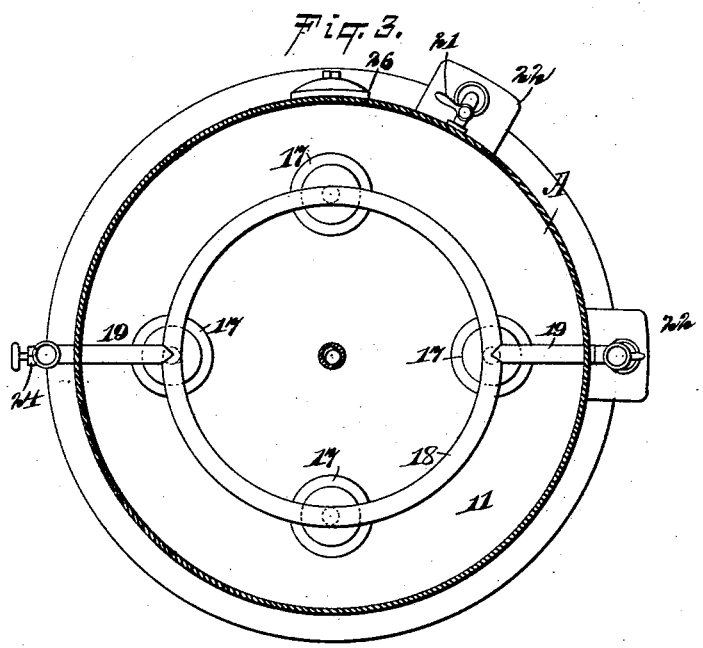
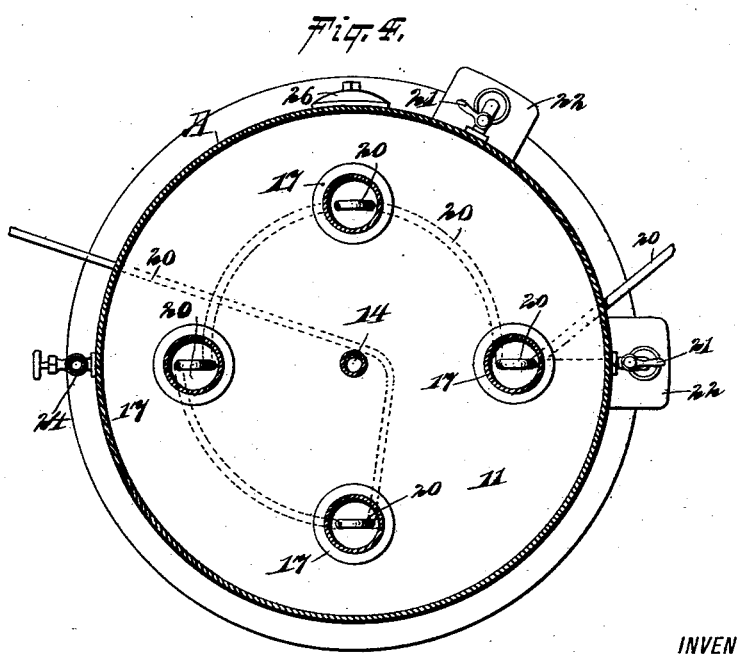

UNITED STATES PATENT OFFICE.

RUDOLPH METZ, OF PHILADELPHIA, PENNSYLVANIA.

WASTE-OIL PURIFIER.

SPECIFICATION forming part of Letters Patent No. 572,020, dated November 24, 1896.

Application filed June 30, 1896. Serial No. 597,641. (No model.)

*To all whom it may concern:*

Be it known that I, RUDOLPH METZ, of Philadelphia, in the county of Philadelphia and State of Pennsylvania, have invented a new and Improved Waste-Oil Purifier, of which the following is a full, clear, and exact specification.

The object of my invention is to provide a purifier for waste oil, so constructed that the oil will not be brought in contact with the steam-coils or other medium for directly supplying heat to the purifier, thus preventing the oil from being scorched and rendered gummy.

Another object of the invention is to distribute within the purifier a series of heating-columns, each column containing water and a heating medium, the oil being contained around the said columns and the heating-columns being so distributed that the oil will receive a uniform and gentle heat throughout the entire area of the tank.

Another object of the invention is to so construct the heating-columns that the heat in all will be uniform and whereby the heat can never reach such a degree as to act detrimentally on the oil.

It is a further object of the invention to construct a purifier for waste oil which will be exceedingly simple, durable, and economic, and from which the oil may be readily drawn off and all sediment cleaned out.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
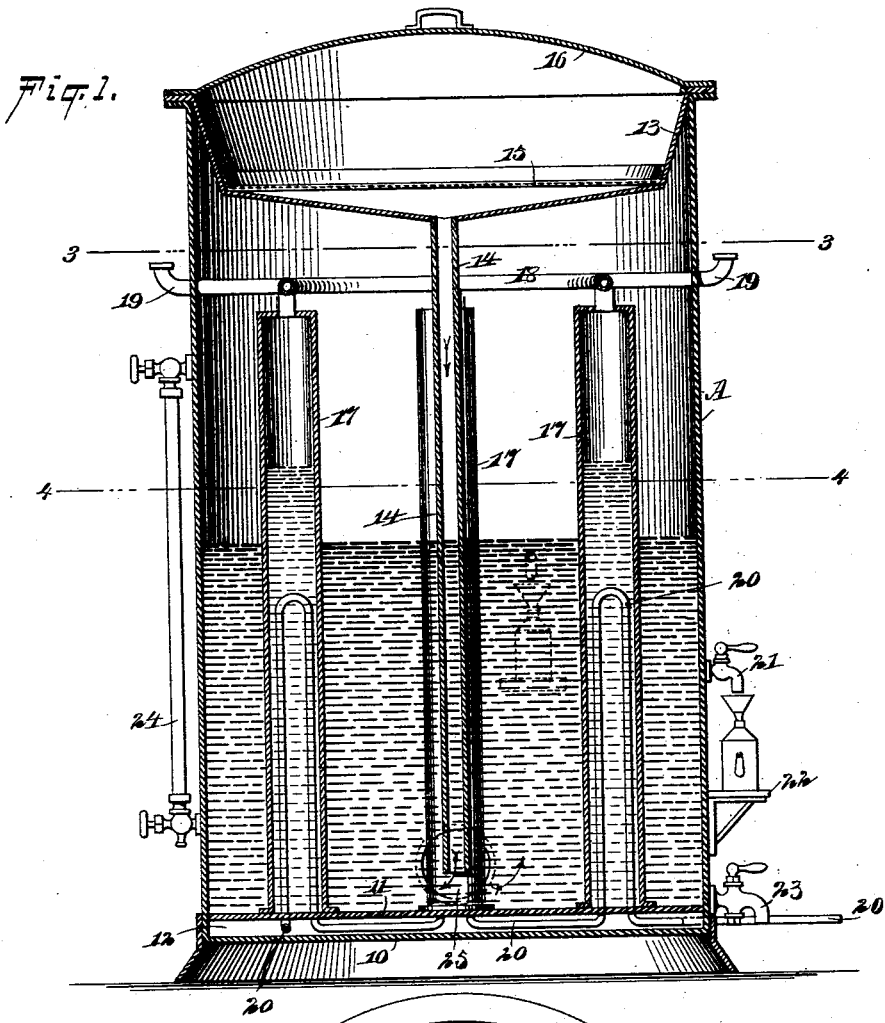
Figure 2:
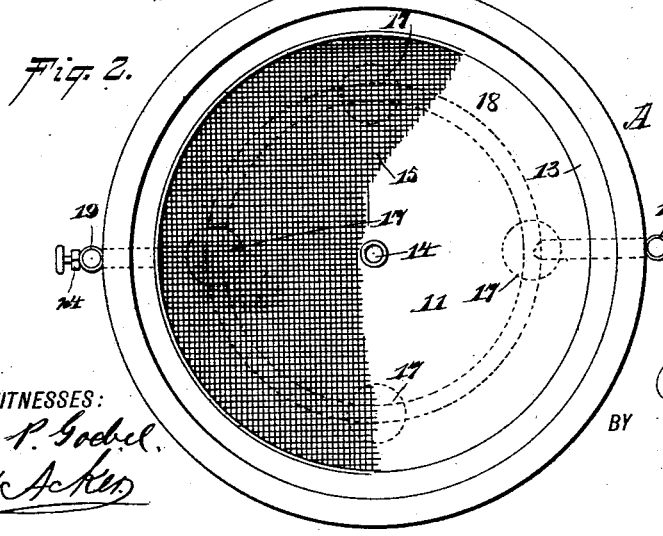

Figure 1 is a vertical longitudinal section through the improved purifier. Fig. 2 is a plan view of the purifier with the lid removed. Fig. 3 is a horizontal section on the line 3 3 of Fig. 1, and Fig. 4 is a horizontal section on the line 4 4 of Fig. 1.

In carrying out the invention the tank A, which constitutes the body of the purifier, may be of any suitable dimensions and shape. Preferably, however, the tank is made round or circular in cross-section and is provided with an outer bottom 10 and an inner bottom 11, a space 12 intervening the two bottoms, as is particularly shown in Fig. 1.

A pan 13 is removably fitted to the top of the tank. The bottom of the pan, which is contained within the tank, slopes downward to the center, and the said pan at the central portion of its bottom is provided with a tube 14, extending downward within a predetermined distance of the inner bottom 11 of the tank, as is also shown in Fig. 1. A strainer 15 is removably located in the pan 13 above its bottom, and the top of the tank and likewise the pan 13 are covered by a lid 16. The waste oil is poured in upon the strainer, which removes all the waste and other undesirable matter, and the dirty oil will then pass down into the tank through the feed-pipe 14.

A number of cylinders 17 are located in the tank, being closed at the top and secured at their lower ends in any approved manner upon the inner bottom 11 of the tank. Four of these cylinders are illustrated in the drawings arranged circularly within the tank at regular distances apart. All of the cylinders 17 are connected at their upper ends with a supply-pipe 18, the said pipe being shown circular in the drawings, especially in Fig. 3, and the supply-pipe 18 is provided, preferably at opposite sides, with branches 19, which extend out through and beyond the sides of the tank, the outer ends of the branches being given an upward turn, the outer ends of the said branches being also open. The cylinders 17 are adapted to contain water, and the water is fed to them through the branch pipes 19 and the feed-pipe 18, through which they extend.

The water in the cylinders 17, which may be termed "water-columns," is heated by means of coils 20, extending upward within each of the columns. The coils in all the columns are connected with a source of steam supply and with each other, and the piping between the coils contained in the columns is located in the space 12 between the bottoms 10 and 11 of the tank.

One or more faucets 21 are located upon the exterior of the tank, and below each faucet a shelf or platform 22 is preferably placed, upon which the oil-can is to rest to be filled by the opening of the faucet above it, and at the bottom of the oil-chamber of the tank a faucet 23 is placed for the purpose of drawing off any sediment that may collect, while at one side of the tank a gage 24 is placed, enabling a person to readily determine the amount of oil there is in the tank, and a manhole 25, provided with a suitable cover 26, is made in the body of the tank at a point best adapted to facilitate cleaning of the said tank.

It is evident that the oil by coming in contact with the heated water-columns cannot become scorched and that the oil will be regularly heated all around the tank and that under no condition can the oil be brought in direct contact with the heat-supplying medium. Consequently the oil is preserved in the best of condition and will not be rendered gummy in the slightest degree. The purifier is furthermore exceedingly simple, and it is durable and economic as well as effective in operation.

Oil-cups will never become clogged up from gum from waste oil purified with an apparatus constructed as described.

Having thus described my invention, I claim as new and desire to secure by Letters Patent—

1. In an oil-purifier, a reservoir for the oil, a series of water-columns located in the said reservoir and spaced apart from each other and from the side of the reservoir, and a conductor of heat located in the said water-columns, whereby the oil placed in the said reservoir will extend around the said columns and may be heated without coming in direct contact with the conductor of heat, as and for the purpose set forth.

2. In an oil-purifier, a reservoir adapted to receive oil, water-columns located within the said reservoir, and heat-conducting coils located in the said columns, the coils being connected at a point below the bottom of the reservoir, whereby the oil is brought in contact with the water-columns and never in contact with the coils, as and for the purpose specified.

3. In an oil-purifier, a reservoir for the oil provided with a double bottom, the two bottoms being spaced one from the other, cylinders secured to the inner bottom and extending upward within the oil-reservoir, the said cylinders being adapted to receive and hold water and provided with a common water-supply, heating-coils located within each of the cylinders, and a connection between the various coils located in the space between the two bottoms of the reservoir, as and for the purpose set forth.

4. In an oil-purifier, a reservoir for the oil, a series of water-columns contained in the said reservoir, a supply-pipe connected with all of the said columns and having branches extending beyond the outer face of the reservoir, the outer ends of which branches are open, and heating-coils located within the said columns, the connections between the coils being without the oil-receiving chamber of the reservoir, as and for the purpose specified.

5. In an oil-purifier, the combination, with a tank having a double bottom, the said tank being adapted to receive oil, a pan located in the upper portion of the reservoir, a strainer and lid for the pan, and a tube extending from the pan within the said tank, of hot-water columns located upon the inner bottom of the tank, a water-supply pipe connected with all of the said columns and having its inlet carried out beyond the tank and normally left open, and heating-coils located within the water-columns, the said coils being connected and the connections located in the space between the two bottoms of the tank, as and for the purpose specified.

RUDOLPH METZ.

Witnesses:
JOHN G. MAHAN,
WM. CRESSMAN.